(No Model.) 4 Sheets—Sheet 1.
H. L. G. CLÉRAC & P. G. R. GUÉROULT.
REGULATOR FOR FLUID MOTORS FOR DYNAMO ELECTRIC MACHINES.
No. 303,620. Patented Aug. 19, 1884.
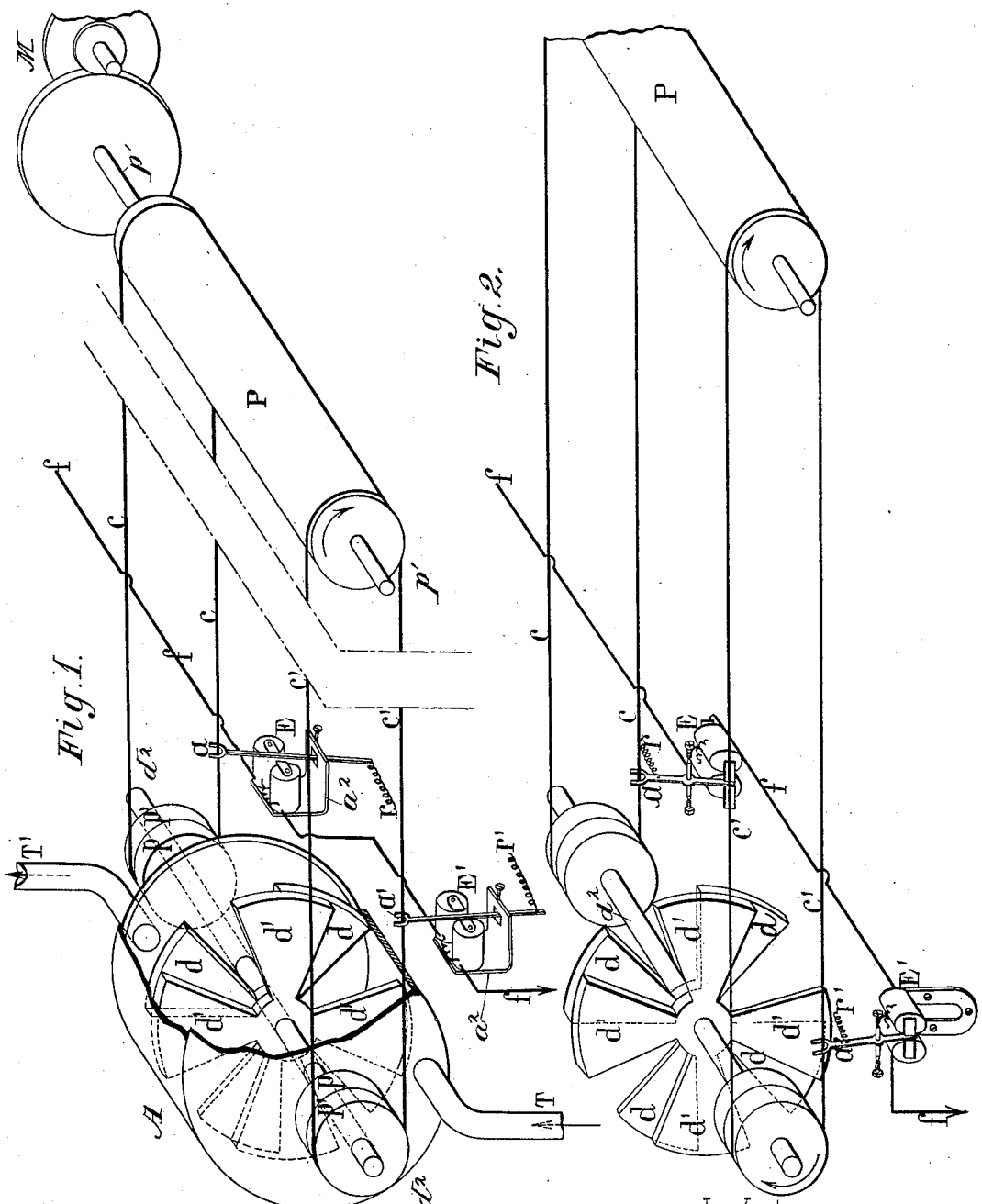

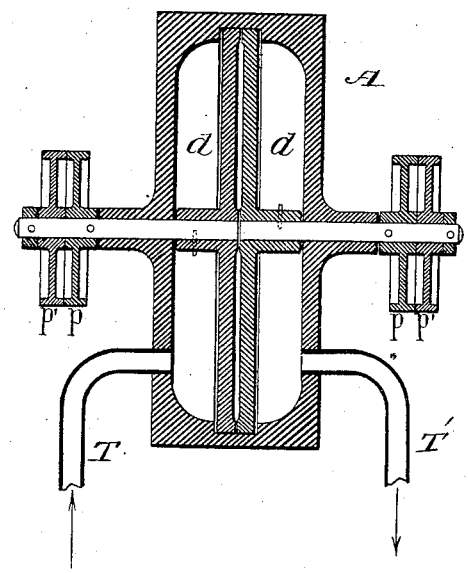
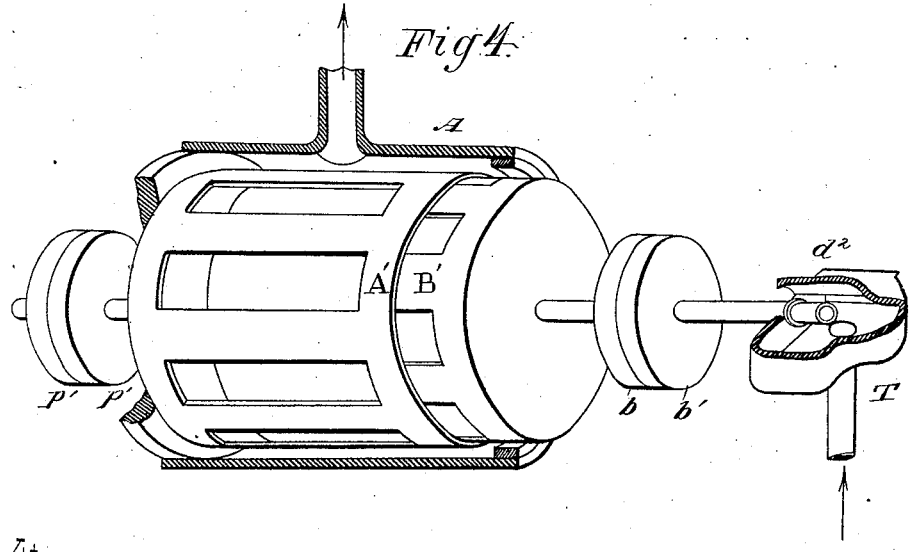

(No Model.) 4 Sheets—Sheet 3.
H. L. G. CLÉRAC & P. G. R. GUÉROULT.
REGULATOR FOR FLUID MOTORS FOR DYNAMO ELECTRIC MACHINES.
No. 303,620. Patented Aug. 19, 1884.
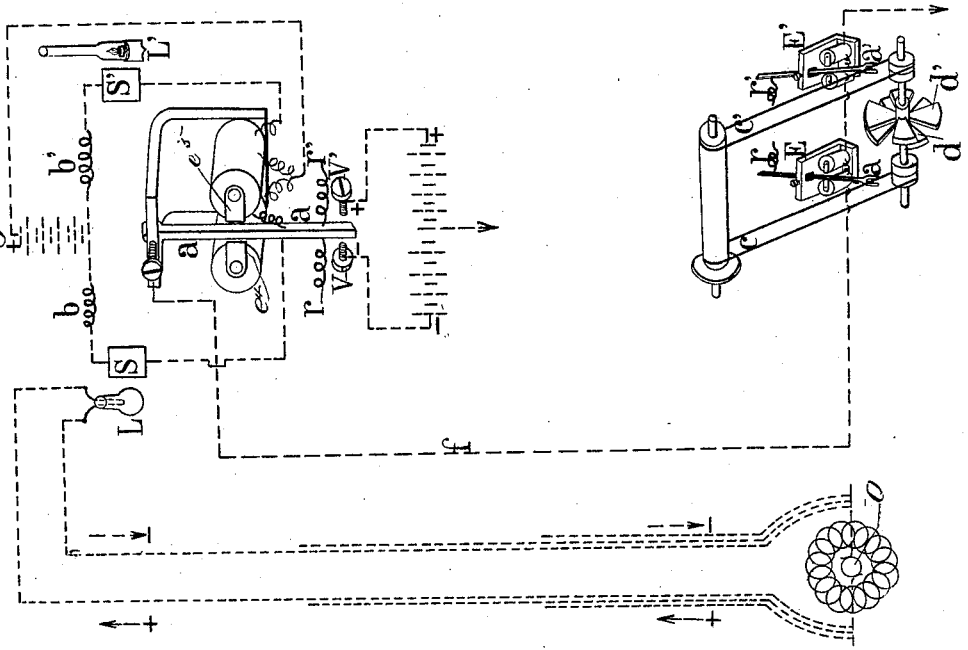
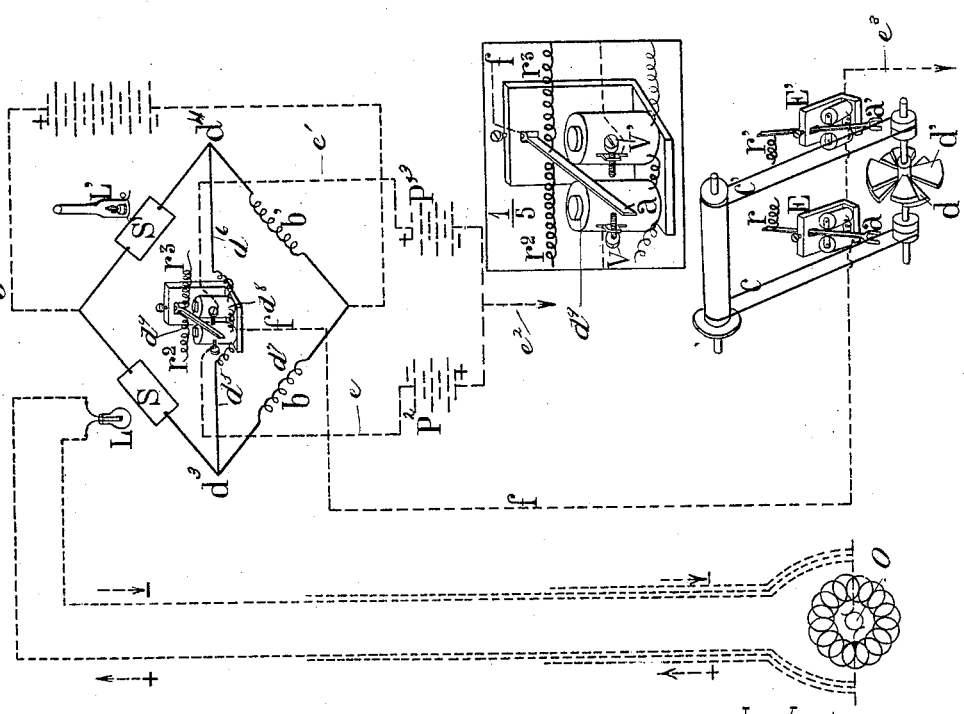
Witnesses —
Charles H. Searle.
M. E. Dey
Inventors —
H. L. G. Clérac
P. G. R. Guéroult
by their attorney J. D. Stetson (No Model.) 4 Sheets—Sheet 4.
H. L. G. CLÉRAC & P. G. R. GUÉROULT.
REGULATOR FOR FLUID MOTORS FOR DYNAMO ELECTRIC MACHINES.
No. 303,620. Patented Aug. 19, 1884.
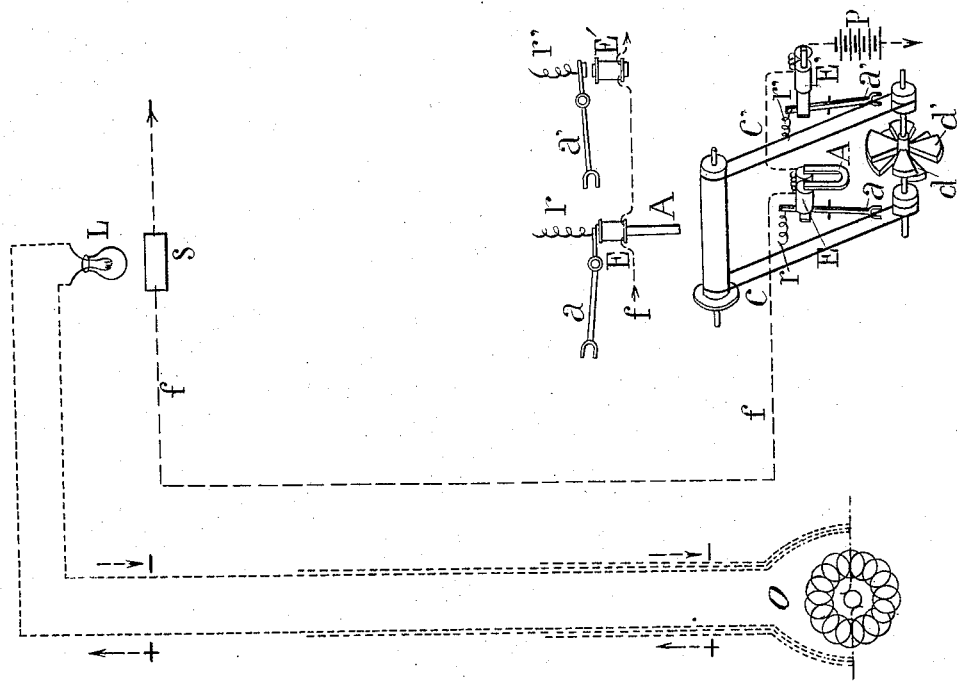

UNITED STATES PATENT OFFICE.

HIPPOLYTE LOUIS GUILLAUME CLÉRAC AND PIERRE GEORGES RAMIRE GUÉ-ROULT, OF PARIS, FRANCE, ASSIGNORS TO SOCIÉTÉ ANONYME DES ATÉ-LIERS DE CONSTRUCTION MECANIQUE ET D'APPAREILS ÉLECTRIQUES, OF SAME PLACE.

REGULATOR FOR FLUID-MOTORS FOR DYNAMO-ELECTRIC MACHINES.

SPECIFICATION forming part of Letters Patent No. 303,620, dated August 19, 1884.

Application filed August 4, 1883. (No model.)

*To all whom it may concern:*

Be it known that we, H. L. G. CLÉRAC and P. G. R. GUÉROULT, citizens of the Republic of France, residing at Paris, in said Republic, have invented certain new and useful Improvements in Means for Automatically Regulating the Operation of Fluid-Motors by Electricity; and we do hereby declare that the following is a full, clear, and exact description of the invention, which will enable others skilled in the art to which it appertains to make and use the same.

This invention relates to certain improvements in means for regulating the distribution of electric currents, water, gas, steam, and other fluids, as more fully hereinafter described; but it is especially designed for automatically regulating and controlling electric currents employed in the production of the electric light.

In the several systems for the distribution of electricity at present employed in the production of an electric light, a lamp is placed in the immediate neighborhood of the dynamo-machine or other generator, which serves, by the variations in the brilliancy of the light to indicate the variations in the lights of the circuit, so as to enable the attendant to regulate to a certain extent the lights in the circuit. This means, however, has proved inadequate or only partially practicable; and our invention has for its objects to remedy this defect. These objects we attain by the means illustrated in the accompanying drawings, which form a part of this specification, and in which—

Figure 1 represents a perspective view showing a portion of our invention; Fig. 2, a similar view showing a modification of the same; Fig. 3, a cross-section of the valve-cylinder and valves shown in Figs. 1 and 2; Fig. 4, a view partly in section and partly in perspective, showing a modification of the valve-cylinder and the driving-pulleys and connecting-pipes. Fig. 5 is a diagram showing a plant arranged to carry my invention into effect; Fig. 6, a diagram of a modification of said plant. Fig. 7 represents a view of the belt-actuating mechanism shown in detail in Fig. 2 and the electric connections for operating the magnets.

In carrying out our invention we substitute for the lamp at the central station certain automatic mechanism regulated and controlled by the current sent over the line, to secure the proper uniformity in the intensity of the current, as more fully hereinafter set forth.

In the accompanying drawings, the letter A indicates a cylindrical valve-chamber provided with two valves, each consisting of a series of juxtaposed segmental wings, $d\ d'$, mounted on independent shafts $d^2$, passing through suitable stuffing-boxes at each end of the valve box or casing. These valves are arranged to rotate in the same direction, and their shafts are provided with fast and loose pulleys $p\ p'$, as indicated.

The letters $c\ c'$ indicate two bands or endless belts, which are arranged to operate in connection with the pulleys on the ends of the respective valve-shafts, the said bands or belts passing around a drum or cylinder, P, which is mounted upon a shaft, P', suitably journaled, to which a slow rotary motion is given by any suitable mechanism, that in the present instance consisting of a train of gearing, M, operated by means of a suitable weight.

The letters T T' indicate the induction and eduction ports of the valve-chamber, one of which leads from a suitable steam-generator and the other to the engine in such manner that the steam is delivered to the said engine in quantities regulated to the rotation of the valves, respectively.

The letters $a\ a'$ indicate two levers. These are pivoted or fulcrumed to the brackets $a^2\ a^2$, their upper ends being bifurcated, and embracing the respective belts or bands before mentioned, as shown, while their lower ends have connected to them the springs $r'\ r'$, by which they are held in normal position. These said levers are constructed of iron, and are provided with suitable armatures, which are adapted to vibrate between the poles of the electro-magnets E E'. These poles, as shown in Fig. 1, are in each set oppositely polarized, so as to be affected by positive and negative currents sent through the helices from the main line $f$ to attract the levers either to the right or left, as may be required to shift the belts or bands from the loose to the fast pulleys, in order to operate one or the other of the valves, as may be required, to regulate the amount of steam passing to the engine.

In the modification shown in Fig. 4 of the drawings the valves consist of two hollow slotted shells, A' B', one working within the other, the passage of the steam being regulated by the rotation of the same as regulated by the belts. The magnets E E' are arranged to automatically operate the belts so as to regulate the driving-power of the engine and the speed of the dynamo by means of the devices shown in Figs. 5 and 6 of the drawings. In Fig. 5 is represented a Wheatstone bridge, in two of the sides of which are interposed the selenium plates S S', the other two sides being provided with resistance-coils $b$ $b'$, equal to the resistance of said plates. From the said bridge extend the wires $d^5$ $d^6$ to the oppositely-polarized magnets $d^7$ $d^8$, between which is arranged to vibrate a lever, $d^9$, the movement of which is limited by the set-screws V V', which serve also as contact makers and breakers, to send, in connection with the lever $d^9$, the positive or negative impulses to the magnets E E'. The said impulses are created through the instrumentalities of the auxiliary batteries $P^2$ $P^3$, which are arranged in a local circuit, with their poles in opposite directions, as indicated by the characters + (plus) and —, (minus.) The wires leading from the upper positive and negative elements of the said batteries connect by conductors $e$ $e'$ with the set-screws above mentioned, and the lower positive and negative elements connect with a ground-wire, $e^2$. The bracket to which the lever $d^9$ is pivoted connects by means of the conductor $f$ with the helices of the magnets E E', which are also connected with a ground-wire, $e^3$, through which the circuit is effected, as will more fully hereinafter appear.

In the modification shown in Fig. 6 an arrangement of the parts is shown by which a similar result may be accomplished, in this case, however, the magnets themselves being provided with oppositely-polarized plates $e^4$ $e^5$, between which the lever vibrates.

The operation of our invention is as follows: Referring to Fig. 5 it will be perceived that the lamp L derives its current from a dynamo or other generator, O. The said lamp is placed contiguous to one of the selenium plates, S, while near the other, S', is placed the lamp L', which is regulated to a proper illuminating standard by means of a photometer, so as to burn continuously at such standard.

It will be evident from the foregoing description that any variation in the respective illuminating-powers of the two lamps will cause a corresponding variation in the resistance of the selenium plates, causing the lever $d^9$ to vibrate to the right or left, so as to send the positive or negative currents to the magnets E E', to shift the belts and operate the valves. The lever $d^9$ is held in normal position by means of the springs $r^2$ $r^3$, so as to occupy a position midway between the poles of the magnets, as indicated.

In the modification shown in Fig. 2 the magnets are arranged to be operated by a current in one direction by suitable automatic mechanism, so as to shift the belts, as before mentioned. In this instance the magnets E E' are not operated by positive and negative currents; but the operation of said magnets is controlled by a variation in the intensity of a permanent current which is made to traverse the helices. The electro-magnet E in this case is not subject to the action of any permanent magnet, and the opposing spring which keeps the armature at a distance from the poles is located in such manner that the pallet obeys a current superior to that traversing the auxiliary wire $f$ when the lamp L throws on the selenium plate the quantity of normal light. The electro-magnet E', on the contrary, Figs. 2 and 7, comes into operation when the intensity of the regulating-current which is transmitted through the helices falls below the normal current—that is to say, if the lamp L does not give sufficient light to the selenium. This electro-magnet, not being polarized by a fixed magnet, A, tends to draw toward it the armature E and pass the belt onto the loose pulley. The electro-magnet E' only operates if the main current is too strong, the electro-magnet E only operating if the current is too weak.

Having described the invention, what we claim as new is—

1. The combination, with the valve-chest having suitable induction and eduction ports, and the valves mounted on independent shafts and provided with fast and loose pulleys, of the endless bands or belts, the mechanism for imparting motion to the same, the shifting-levers, and the electro-magnets operated alternately by automatically-operated mechanism to regulate the flow of steam through the valve-chest, substantially as specified.

2. The combination, with the valves located in a suitable valve-chest and mounted upon independently moving shafts provided with fast and loose pulleys, of the shifting-levers and endless belts, and the magnets arranged to receive electric impulses in opposite directions, whereby the shifting-levers are operated to move the belts and operate the valves, substantially as and for the purposes set forth.

3. The combination, with the magnets operating the shifting-levers and an electric light receiving its current from a suitable generator and a standard lamp, of an automatic regulator having a main battery connected with an adjusted circuit embracing two selenium plates, an electro-magnet embraced in a circuit with two batteries having their poles reversed, a vibrating make and break lever, and suitable conductors whereby reverse currents may be automatically transmitted to the magnets for operating the belt-shifting levers, as herein specified.

In testimony whereof we have signed this specification in the presence of two subscribing witnesses.

HIPPOLYTE LOUIS GUILLAUME CLÉRAC.
  PIERRE GEORGES RAMIRE GUÉROULT.

Witnesses:
 EUG. DUBRUL,
 L. GENÉS.